United States Patent Office 3,360,399
Patented Dec. 26, 1967

3,360,399
METHOD OF REMOVING PHOSPHATE SCALE
John A. Knox and William E. Billings, Duncan, Okla., assignors to Halliburton Company, Duncan, Okla., a corporation of Delaware
No Drawing. Filed Apr. 15, 1966, Ser. No. 542,748
13 Claims. (Cl. 134—3)

ABSTRACT OF THE DISCLOSURE

A method of removing phosphate scales from boilers, heat exchanger tubes, and other equipment comprising treating the phosphate scale with a sulfuric acid solution to thereby form a sulfate, treating the said sulfate with a solution of a water-soluble carbonate or hydroxide or with anhydrous ammonia or mixtures thereof to thereby form an acid soluble salt and treating the acid soluble salt with an acid reactable therewith to form a water-soluble salt which can then be readily rinsed from the equipment.

---

This is a continuation-in-part of U.S. application Ser. No. 283,602 filed May 27, 1963, now abandoned.

The present invention relates to a new and improved method of removing scale from boilers, heat exchanger tubes, and other equipment, particularly equipment having scale in relatively inaccessible places.

The present invention is especially adapted for the removal of phosphate scale such as hydroxyapatite. Hydroxyapatite is a form of calcium phosphate, $$\tfrac{1}{2}(Ca(OH)_2 \cdot 3Ca_3(PO_4)_2)$$

which is often formed in industrial boilers, associated piping, and other equipment. It is not readily soluble in any known acid or caustic solution.

A hot solution of sulfuric acid will convert hydroxyapatite from calcium phosphate to calcium sulfate and the resultant sulfate scale is not tenacious, and may be washed off of the equipment by violent circulation of aqueous fluids or by high pressure water hoses. Some degree of success has been achieved with this method, but the geometry of boilers and other equipment is often such that this method is not feasible.

It is therefore a primary object of the present invention to provide a new and improved method of removing scale from boilers and other equipment, regardless of the geometric configurations of such boilers and equipment.

Another object of the present invention is to provide a new and improved method of removing phosphate scale from boilers and other equipment, and particularly a method of removing hydroxyapatite.

It has been discovered that by treating the calcium sulfate, formed by the action of sulfuric acid on hydroxyapatite, with a water soluble hydroxide and/or a water soluble carbonate, and in the preferred form of the invention, a mixture of ammonium carbonate and sodium carbonate, and then treating with a dilute acid, the calcium salt thereof being soluble, that the scale can be effectively removed from the equipment being treated. This unique and novel method enables the scale to be completely dissolved and violent agitation or high pressure washing is eliminated or no longer necessary.

Although not wishing to be bound by any particular theory, it is believed that the following chemical reactions occur in this process when using sulphuric acid, sodium carbonate and hydrochloric acid:

(1) Sulfuric acid treatment $$\tfrac{1}{2}(Ca(OH)_2 \cdot 3Ca_3(PO_4)_2) + H_2SO_4 = CaSO_4 + H_3PO_4$$

(2) Carbonate treatment $$Na_2CO_3 + CaSO_4 = CaCO_3 + Na_2SO_4$$

(The addition of ammonium carbonate hastens this reaction.)

(3) Acid treatment (calcium salt soluble)

$$HCl + CaCO_3 = CaCl_2 + H_2O + CO_2$$

A number of laboratory tests have been made demonstrating the solubility of gypsum or calcium sulfate in various water soluble carbonates and water soluble hydroxides. These are set forth hereinbelow in Tables I–III.

Table I

*Procedure.*—The gypsum solubility tests were run by placing 20.0 grams of reagent grade gypsum in 200 cc. of solution at room temperature (72° F.) for 24 hours and 72 hours. The converted gypsum and the unreacted gypsum were filtered and then placed in 200 cc. of 15% hydrochloric acid for 2 hours after which, the solution was titrated for the amount of calcium in solution using CDTA (disodiumdihydrogen 1,2 - cyclohexanediaminetetraacetate). Thereby, the amount of gypsum dissolved was calculated.

[Test conditions: 20 gms. reagent gyp, 200 cc. solution, 24 and 72 hours at 72° F.]

| Type of Solution | Conc., gm./l. | Amt. of Gyp Diss./ 200 cc. in 24 hrs. | | Amt. of Gyp Diss./ 200 cc. in 72 hrs. | |
|---|---|---|---|---|---|
| | | Grams | Percent | Grams | Percent |
| $NH_4HCO_3$—$Na_2CO_3$ | 60–60 | 17.75 | 88.7 | 18.1 | 90.5 |
| $NH_4HCO_3$—$Na_2CO_3$—KOH | 60–60–60 | 17.71 | 88.6 | 19.1 | 96.5 |
| $NH_4HCO_3$—$NH_4OH$ | 40–30 | 17.6 | 88.0 | | |
| $NH_4HCO_3$ | 120 | 17.55 | 87.8 | 18.2 | 91.0 |
| $Na_2CO_3$ | 120 | 16.75 | 83.8 | 17.1 | 85.5 |
| $Na_2CO_3$—NaOH | 60–60 | 14.2 | 71.2 | 17.1 | 85.5 |
| KOH | 120 | 13.5 | 67.6 | 14.3 | 71.5 |

Table II

*Procedure:*—The gypsum solubility tests were run by placing 20.0 grams of oil coated gyp crystals in 200 cc. solution at room temperature (72° F.) for 24 hours. The solution was then decanted off and replaced with 250 cc. of 15% HCl for 2 hours after which, the crystals were filtered off, washed, dried, and reweighed to determine the amount of gyp dissolved.

[Test conditions: 20 gms. oil wet gyp crystals, 200 cc. gyp solution, 24 hrs. at 72° F.]

| Type of Solution | Conc., gm./l. | Amt. of Gyp Diss./ 200 cc. in 24 hrs. | |
|---|---|---|---|
| | | Grams | Percent |
| $(NH_4)_2CO_3$ | 120 | 15.40 | 77.0 |
| $NH_4HCO_3$ | 120 | 15.25 | 76.2 |
| $KOH$ | 120 | 13.90 | 69.4 |
| $Na_2CO_3$—$NaOH$ | 60–60 | 13.50 | 67.5 |
| $NH_4HCO_3$—$Na_2CO_3$—Pen—5 [1] | 60–60–0.2% | 13.09 | 65.3 |
| $NH_4HCO_3$—$Na_2CO_3$—$KOH$ | 60–60–60 | 12.90 | 64.5 |
| $NH_4HCO_3$—$Na_2CO_3$ | 60–60 | 12.85 | 64.3 |
| $Na_2CO_3$ | 120 | 12.00 | 60.0 |
| $NaHCO_3$—$NH_4OH$ | 90–30 | 11.30 | 56.4 |
| $NH_4HCO_3$—$NH_4OH$ | 90–30 | 10.25 | 51.2 |

[1] Trimethyl ether of polyethylene glycol.

*Table III*

*Procedure.*—The gypsum solubility tests were run by placing weighed 1 in. by 1 in. gypsum blocks in 200 cc. of solution at room temperature for 24 hours. The gypsum blocks were then removed, washed, and placed in 250 cc. of 15% HCl for 2 hours. The gypsum blocks were dried in an oven at 120° F. for 24 hours, allowed to cool in a desiccator, and reweighed to determine the amount of gypsum dissolved.

A few tests with KOH and NaOH were run at different temperatures and different contact times.

[Test conditions: 1″ x 1″ gypsum block, 200 cc. gyp solution, 24 hrs. at 72° F.]

| Type of Solution | Conc., gm./l. | Initial Wt., gms. | Final Wt., gms. | Gms. Diss./ 200 cc. |
|---|---|---|---|---|
| $Na_2CO_3$—$NaOH$ | 60–60 | 36.91 | 27.35 | 9.56 |
| $NH_4HCO_3$—$Na_2CO_3$—EDTA [1] | 60–60–5% | 31.90 | 24.60 | 7.30 |
| $K_2CO_3$ | 120 | 48.05 | 41.34 | 6.71 |
| $NH_4HCO_3$—$Na_2CO_3$—$KOH$ | 60–60–60 | 37.10 | 31.02 | 6.08 |
| $NH_4HCO_3$ | 120 | 45.02 | 40.13 | 4.89 |
| $KOH$ | 120 | 52.65 | 42.83 | 4.82 |
| $Na_2CO_3$ | 120 | 29.31 | 24.73 | 4.58 |
| $NH_4HCO_3$—$Na_2CO_3$ | 60–60 | 34.95 | 30.69 | 4.26 |
| $NH_4HCO_3$—$Na_2CO_3$—DPTA [2] | 60–60–5% | 38.60 | 34.65 | 3.95 |
| $NH_4HCO_3$—$Na_2CO_3$—Na Gluconate | 60–60–5% | 48.8 | 44.98 | 3.82 |
| $NH_4HCO_3$—$KOH$ | 60–120 | 56.1 | 50.2 | 5.9 |

[Test conditions: 1″ x 1″ gyp block, 200 cc. soln., 6 hrs. at 45° F.]

| | | | | |
|---|---|---|---|---|
| NaOH | 111 (10%) | 40.75 | 34.46 | 6.29 |
| NaOH | 398 (30%) | 40.00 | 36.20 | 3.80 |
| KOH | 109 (10%) | 39.17 | 36.33 | 2.84 |
| KOH | 382 (30%) | 41.84 | 34.32 | 7.52 |

[Test conditions: 1″ x 1″ gyp blocks, 200 cc. soln., 6 hrs. at 150° F.]

| | | | | |
|---|---|---|---|---|
| NaOH | 111 (10%) | 63.09 | 45.37 | 17.72 |
| NaOH | 398 (30%) | 47.94 | 38.50 | 9.44 |
| KOH | 109 (10%) | 52.59 | 37.50 | 15.09 |
| KOH | 382 (30%) | 58.29 | 31.01 | 27.28 |

[1] Ethylenediaminetetraacetic acid.
[2] Diethylenetriaminepentaacetic acid.

In one preferred form of the present invention for removing hydroxyapatite, the following steps are recommended:

(1) Degrease the scale with a weak caustic solution and a surface tension reducer at 180° F. Tergitol 4, an industrial grade of sodium tetradecyl sulfate is an example of a suitable surface tension reducer.

(2) Wash with water.

(3) Fill the equipment with a 1% to 10% inhibited sulfuric acid solution and soak at 160° F. for about four hours.

(4) Wash with water.

(5) Fill with a solution of ammonium carbonate and sodium carbonate and soak at 180° F. to 200° F. for about four hours. A solution of ½ pound each of ammonium carbonate (or ammonium bicarbonate) and sodium carbonate to one gallon of water has been found to be very satisfactory. Sodium carbonate and aqua ammonia, or sodium carbonate and anhydrous ammonia can be substituted. A small amount of a surface tension reducer may also be added if desired. About 0.1% of Tergitol 4 is satisfactory. If brass or copper is exposed to the solution, the ammonium carbonate or ammonium ion should be omitted and a comparable amount of sodium carbonate substituted therefor.

(6) Rinse with water.

(7) Wash with a 5% to 15% hydrochloric acid solution.

(8) Rinse with water.

(9) Rinse with a suitable neutralizing and passivating solution such as 1% sodium carbonate, sodium nitrite or ammoniated citric acid and sodium nitrite.

The particular solution used here is dependent upon the nature of the fluid previously in the system. This solution will usually be sodium carbonate with ammoniated citric acid or sodium carbonate with sodium nitrite. Any other suitable neutralizing and passivating solution may be used without departing from the scope of the invention.

Higher concentrations of acid, either sulfuric or hydrochloric, may be used when desired.

In converting the phosphates to sulfates, a temperature range of from 100° F. to 150° F. may be preferable in some instances in order to prevent the formation of anhydrite.

An industrial cleaning job which required the removal of hydroxyapatite and magnetite scale from three boilers was successfully conducted for a refinery in southern Texas. In the job, the scale was completely removed. A daily log of the treatments in carrying out the method of the present invention is as follows:

*First day.*—Acidized the south boiler with a 5% inhibited sulfuric acid solution at 180° F. for seven hours. Rinsed or washed with water. Neutralized with ammoniated citric acid solution.

*Second day.*—Acidized middle boiler with 5% inhibited sulfuric acid solution at 180° F. for eight hours. Washed with water. Neutralized with ammoniated citric acid solution. Rinsed south boiler.

*Third day.*—Acidized north boiler with inhibited 5% sulfuric acid solution at 180° F. for eight hours. Washed with water. Neutralized with ammoniated citric acid solution. Rinsed middle boiler. Treated south boiler with a solution of 100 pounds of sodium hydroxide in 1800 gallons of water at 200° F. for eight hours.

*Fourth day.*—Washed south and middle boilers. Treated middle boiler with 100 pounds of sodium hydroxide in 1800 gallons of water at 200° F. for eight hours. Washed middle boiler with water.

*Fifth day.*—Acidized middle boiler with a 10% hydrochloric acid solution for four hours at 180° F. At this stage, the scale still was not removed from the boiler. Then utilizing the present invention, each boiler was treated with a solution of 600 pounds of soda ash and 275 pounds of ammonium bicarbonate in 1700 gallons of water for four hours at 180° F., and then each boiler was treated with a 10% hydrochloric acid solution for two hours at 180° F. Neutralized all boilers with soda ash and sodium nitrite. Rinsed all boilers with water. Rigged down and truck loaded. Job completed at 3:00 a.m. of sixth day.

In cleaning the above three boilers, the following materials were used:

| | | |
|---|---|---|
| 93.2% sulfuric acid | lbs | 2400 |
| 20% hydrochloric acid | gal | 1000 |
| Soda ash | lbs | 1000 |
| Aqua ammonia | lbs | 300 |
| Ammonium bicarbonate | lbs | 300 |
| Citric acid | lbs | 200 |
| Sodium hydroxide | lbs | 200 |
| Sodium nitrite | lbs | 15 |
| Inhibitor for sulfuric acid | gal | 25 |

The above job was originally planned using prior art methods. When these prior art methods failed, the method of the present invention was recommended and carried out thus dramatically providing the effectiveness of the instant invention.

Although sodium carbonate and ammonium carbonate are preferred because of their ready availability and costs, any other water soluble carbonate or water soluble hydroxide or mixtures thereof may be used without departing from the scope of the present invention. Some other examples of water soluble carbonates are potassium carbonate, lithium carbonate, potassium bicarbonate, lithium bicarbonate, sodium bicarbonate and ammonium bicarbonate. Some examples of water soluble hydroxides are sodium hydroxide, potassium hydroxide, lithium hydroxide and ammonium hydroxide.

The above described methods are by way of illustration only, and the scope of the invention is determined by the claims as set forth hereinbelow.

In carrying out the present invention, the acids used, principally sulfuric acid and hydrochloric acid, should be inhibited with a suitable corrosion inhibitor.

Broadly, the present invention relates to a new and improved method of removing scale from industrial equipment.

What is claimed is:

1. A method of removing hydroxyapatite and other phosphate scales from boilers, heat exchanger tubes, and other equipment, comprising the steps of:
    (a) Treating the phosphate scale with a sulfuric acid solution to thereby form a sulfate;
    (b) Treating the sulfate formed by the action of the sulfuric acid on the scale with a solution selected from the group consisting of water soluble carbonates, water soluble hydroxides, anhydrous ammonia or mixtures thereof to thereby form an acid soluble salt; and,
    (c) Treating the product formed by the previous step with an acid reactable with said product to form a water soluble salt.

2. A method of removing hydroxyapatite and similar phosphate scales from boilers, heat exchanger tubes and other equipment, comprising the steps of:
    (a) Treating the phosphate scales with a sulfuric acid solution to thereby form a sulfate;
    (b) Treating the sulfate formed from the previous step with a solution selected from the group consisting of lithium carbonate, potassium carbonate, sodium carbonate, ammonium carbonate, lithium bicarbonate, potassium bicarbonate, sodium bicarbonate, ammonium bicarbonate, a mixture of sodium carbonate and ammonium carbonate, a mixture of sodium carbonate and aqua ammonia, a mixture of sodium carbonate and anhydrous ammonia and mixtures thereof to thereby form a carbonate; and
    (c) Treating the carbonate formed by the previous step with hydrochloric acid, thereby forming a water soluble salt of said hydrochloric acid.

3. A method of removing hydroxyapatite and other phosphate scales from boilers, heat exchanger tubes and other equipment, comprising the steps of:
    (a) Soaking the phosphate scale in an inhibited sulfuric acid solution to thereby form a sulfate;
    (b) Soaking the sulfate formed by the action of the sulfuric acid on the scale with a solution selected from the group consisting of sodium hydroxide, potassium hydroxide, lithium hydroxide, ammonium hydroxide and mixtures thereof to thereby form a hydroxide; and,
    (c) Soaking the hydroxide formed by the previous step with an inhibited hydrochloric acid solution, thereby forming a water soluble salt of said hydrochloric acid.

4. A method of removing hydroxyapatite and other phosphate scales from boilers, heat exchanger tubes and other equipment, comprising the steps of:
    (a) Soaking the scale in an inhibited solution of from about .1% to about 10% sulfuric acid to thereby form a sulfate;
    (b) Treating the sulfate formed by the action of the sulfuric acid on the scale with a solution selected from the group consisting of water soluble carbonates, water soluble hydroxides, anhydrous ammonia and mixtures thereof to thereby form an acid soluble salt; and
    (c) Soaking the product formed by the previous step with an inhibited solution of about 5% to about 15% hydrochloric acid, thereby forming a water soluble salt of said hydrochloric acid.

5. A method of removing hydroxyapatite and other phosphate scales from boilers, heat exchanger tubes, and other equipment, comprising the steps of:
    (a) Soaking the phosphate scale with an inhibited sulfuric acid solution at a temperature of about 100° F. to about 180° F. for about four hours to thereby form a sulfate;
    (b) Soaking the sulfate formed from the previous step with a solution of sodium carbonate and ammonium carbonate at a temperature of about 100° F. to about 200° F. for about four hours to thereby form a carbonate; and
    (c) Washing with an inhibited solution of hydrochloric acid, thereby forming a water soluble salt of said hydrochloric acid.

6. A method of removing hydroxyapatite and other phosphate scales from boilers, heat exchanger tubes and other equipment, comprising the steps of:
    (a) Soaking the phosphate scale with an inhibited sulfuric acid solution at a temperature of about 100° F. to about 180° F. for about four hours to thereby form a sulfate;
    (b) Soaking the sulfate formed from the previous step with a solution of sodium carbonate and ammonium carbonate at a temperature of about 100° F. to about 200° F. for about four hours to thereby form a carbonate;
    (c) Washing with an inhibited solution of hydrochloric acid, thereby forming a water soluble salt of said hydrochloric acid; and
    (d) Rinsing with a neutralizing and passivating solution.

7. The method of claim 6, wherein the neutralizing and passivating solution is selected from the group consisting of sodium carbonate, sodium nitrite, ammoniated citric acid and mixtures thereof.

8. A method of removing hydroxyapatite and other phosphate scales from boilers, heat exchanger tubes, and other equipment, comprising the steps of:
  (a) Degreasing the scale with a weak caustic solution at a temperature of about 180° F;
  (b) Rinse with water;
  (c) Soaking the scale with an inhibited solution of from about .1% to about 10% sulfuric acid at a temperature of from about 160° F. to about 180° F. for about four hours to thereby for a sulfate;
  (d) Rinse with water;
  (e) Soaking the sulfate formed from step (c) with a solution of sodium carbonate and ammonium carbonate at a temperature of about 180° F. to 200° F. for about four hours to thereby form a carbonate;
  (f) Rinse with water;
  (g) Washing with an inhibited solution of about 5% to about 15% hydrochloric acid, thereby forming a water soluble salt of hydrochloric acid; and,
  (h) Rinsing with water.

9. The method of claim 8, wherein a surface tension reducer is added to the weak caustic solution and to the carbonate solution.

10. The method of claim 8, wherein the carbonate solution comprises about one-half pound of each sodium carbonate and ammonium carbonate to a gallon of water.

11. The method of claim 8, wherein the carbonate solution comprises about one pound of sodium carbonate per gallon of water.

12. The method of claim 8, including the final step of rinsing with a neutralizing and passivating solution.

13. The method of claim 12, wherein the neutralizing and passivating solution is selected from the group consisting of sodium carbonate, sodium nitrite, ammoniated citric acid and mixtures thereof.

References Cited

UNITED STATES PATENTS

| | | | |
|---|---|---|---|
| 1,049,054 | 12/1912 | Coombs | 134—29 |
| 2,140,183 | 12/1938 | Bresler | 166—21 |
| 2,524,757 | 10/1950 | Brines et al. | 134—3 |
| 2,662,042 | 12/1953 | Dougherty et al. | 134—28 X |
| 2,787,326 | 4/1957 | Hughes | 166—38 |
| 2,884,349 | 4/1959 | Axelrad | 134—41 X |
| 3,170,815 | 2/1965 | White | 134—27 |

MICHAEL E. ROGERS, *Primary Examiner.*